United States Patent
Roth et al.

(10) Patent No.: US 10,316,166 B2
(45) Date of Patent: Jun. 11, 2019

(54) FLAME-RETARDANT POLYAMIDES WITH PALE COLOR

(71) Applicant: BASF SE, Ludwigshafen (DE)

(72) Inventors: Michael Roth, Lautertal (DE);
Alexander König, Bruchsal (DE);
Peter Deglmann, Mannheim (DE);
Klaus Uske, Bad Dürkheim (DE);
Christoph Minges, Burrweiler (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/029,999

(22) Filed: Sep. 18, 2013

(65) Prior Publication Data

US 2014/0080949 A1    Mar. 20, 2014

Related U.S. Application Data

(60) Provisional application No. 61/702,753, filed on Sep. 19, 2012.

(51) Int. Cl.
| | |
|---|---|
| *C08K 5/098* | (2006.01) |
| *C08K 5/00* | (2006.01) |
| *C08K 3/16* | (2006.01) |
| *C08K 3/32* | (2006.01) |
| *C08K 3/22* | (2006.01) |
| *C08K 3/30* | (2006.01) |
| *C08K 3/02* | (2006.01) |
| *C08J 3/22* | (2006.01) |

(52) U.S. Cl.
CPC .............. *C08K 5/098* (2013.01); *C08J 3/226* (2013.01); *C08K 3/02* (2013.01); *C08K 3/16* (2013.01); *C08K 3/22* (2013.01); *C08K 3/30* (2013.01); *C08K 3/32* (2013.01); *C08K 5/0091* (2013.01); *C08J 2377/00* (2013.01); *C08J 2423/08* (2013.01); *C08K 2003/026* (2013.01)

(58) Field of Classification Search
CPC ........ C08K 5/098; C08K 5/0091; C08K 3/16; C08K 3/32; C08K 3/22; C08K 3/30; C08K 3/02; C08K 2003/026; C08J 3/226; C08J 2377/00; C08J 2423/08
See application file for complete search history.

(56) References Cited

U.S. PATENT DOCUMENTS

| | | | | |
|---|---|---|---|---|
| 4,877,823 A | * | 10/1989 | Plachetta | C08K 3/02 524/160 |
| 2003/0045621 A1 | * | 3/2003 | Aramaki et al. | 524/394 |
| 2012/0196962 A1 | * | 8/2012 | Kobayashi | C08K 3/0033 524/204 |

FOREIGN PATENT DOCUMENTS

JP    2001-348493 A    12/2001

OTHER PUBLICATIONS

European Search Report for EP 12184935 dated Jan. 17, 2013.
International Search Report and Written Opinion of the International Search Authority for PCT/EP2013/066876 dated Feb. 10, 2013.
Translation of the International Search Report for PCT/EP2013/066876 dated Feb. 10, 2013.

* cited by examiner

*Primary Examiner* — Robert T Butcher
(74) *Attorney, Agent, or Firm* — Drinker Biddle & Reath LLP

(57) ABSTRACT

Thermoplastic molding compositions comprising
A) from 10 to 99.8% by weight of a thermoplastic polyamide,
B) from 0.1 to 60% by weight of red phosphorus,
C) from 0.01 to 4% by weight of a Cu(I) salt or Ag(I) oxide or Cu(I) complex or Ag(I) salt or Cu(I) oxide or Ag(I) complex, or a mixture of these,
D) from 0 to 40% by weight of an impact modifier, and
E) from 0 to 60% by weight of further additional substances,
where the total of the percentages by weight of A) to E) is 100%.

7 Claims, No Drawings

FLAME-RETARDANT POLYAMIDES WITH PALE COLOR

CROSS-REFERENCE TO RELATED APPLICATIONS

This application claims the benefit of U.S. Provisional Application 61/702,753, filed Sep. 19, 2012, which is incorporated herein by reference.

The present invention relates to thermoplastic molding compositions comprising
A) from 10 to 99.8% by weight of a thermoplastic polyamide,
B) from 0.1 to 60% by weight of red phosphorus,
C) from 0.01 to 4% by weight of a Cu(I) salt or Ag(I) oxide or Cu(I) complex or Ag(I) salt or Cu(I) oxide or Ag(I) complex, or a mixture of these,
D) from 0 to 40% by weight of an impact modifier, and
E) from 0 to 60% by weight of further additional substances,
where the total of the percentages by weight of A) to E) is 100%.

The invention further relates to the use of Cu(I) compounds and/or Ag(I) compounds for the production of PA molding compositions, with particular color values, and also with improved UV resistance, and also with reduced phosphine emission.

The present invention also relates to the use of molding compositions of this type for the production of fibers, foils, and moldings, and to the resultant moldings, fibers, and foils of any type.

It is known that addition of red phosphorus to thermoplastics, especially to reinforced or filled polyamides, leads to effective fire protection (DE-A-1931387). However, under unfavorable conditions, e.g. increased temperature or moisture, or presence of alkali or oxygen, red phosphorus tends to form decomposition products, such as phosphine and acids of mono- to pentavalent phosphorus. Although red phosphorus incorporated within thermoplastics, e.g. polyamides, has substantial protection from thermooxidation because of embedding into the polymer, decomposition products can nevertheless be formed in the relatively long term even in these instances. This is disadvantageous insofar as if pellets are incorrectly processed in the injection-molding process the resultant phosphine can cause unpleasant odor, and moreover is toxic. The phosphorus acids arising at the same time can deposit on the surface of moldings, a particular result of this being that the tracking resistance of the moldings is reduced. There has therefore been no lack of attempts to improve the stability of the red phosphorus used as flame retardant for plastics.

A stabilizing effect can be achieved for polyamide by adding oxides or hydroxides of zinc, of magnesium, or of copper, see by way of example WO2000/22035 (heat-aging resistance provided by Cu compounds and complexes in polyamides), EP1211220 (coating of red phosphorus with metallic silver), EP-A-283 759 (phlegmatization of phosphorus with Sn oxide hydrate and MF resins), DE-A-10332852 (coating of red phosphorus with white pigments based on $TiO_2$ and MF resins).

However, molding compositions known from the prior art have an undesired reddish intrinsic color, with corresponding difficulty in achieving color for pale and gray applications. UV resistance is unsatisfactory.

Furthermore, flame-retardant compounded polyamide materials using red phosphorus release small amounts of phosphine—specifically during processing. Phosphine is firstly toxic and secondly causes formation of contact deposits on metallic conductors. In order to stabilize the phosphorus, an acid scavenger is added to the compounded polyamide material in order to prevent the acid-catalyzed disproportionation of the phosphorus to give phosphine. However, there is no resultant lasting prevention of phosphine evolution/complexing.

It was therefore an object of the present invention to provide polyamides rendered flame-retardant by using red phosphorus and exhibiting little reddish intrinsic color, improved ease of achieving color for pale and gray applications, better UV resistance, and relatively little phosphine formation.

Accordingly, the molding compositions defined in the introduction have been found. Preferred embodiments can be found in the dependent claims.

It has been found that the addition of small amounts of Cu(I) compounds and/or Ag(I) compounds to flame-retardant compounded polyamide materials based on red phosphorus leads to a color change from red to gray coloration of the compounded material. Surprisingly, the resultant color does not change when irradiated with (UV) light, and it is therefore suitable for pale colorations. It has moreover been found that the addition of the compounds of the invention leads to a great reduction in the release of phosphine from the flame-retardant compounded polyamide materials.

The molding compositions of the invention comprise, as component A), from 10 to 98% by weight, preferably from 20 to 98% by weight, and in particular from 30 to 90% by weight, of at least one polyamide.

The polyamides of the molding compositions of the invention generally have an intrinsic viscosity of from 90 to 350 ml/g, preferably from 110 to 240 ml/g, determined in a 0.5% strength by weight solution in 96% strength by weight sulfuric acid at 25° C. to ISO 307.

Preference is given to semicrystalline or amorphous resins with a molecular weight (weight average) of at least 5000, described by way of example in the following U.S. Pat. Nos. 2,071,250, 2,071,251, 2,130,523, 2,130,948, 2,241,322, 2,312,966, 2,512,606, and 3,393,210.

Examples of these are polyamides that derive from lactams having from 7 to 13 ring members, e.g. polycaprolactam, polycaprylolactam, and polylaurolactam, and also polyamides obtained via reaction of dicarboxylic acids with diamines.

Dicarboxylic acids which may be used are alkanedicarboxylic acids having 6 to 12, in particular 6 to 10, carbon atoms, and aromatic dicarboxylic acids. Merely as examples, those that may be mentioned here are adipic acid, azelaic acid, sebacic acid, dodecanedioic acid and terephthalic and/or isophthalic acid.

Particularly suitable diamines are alkanediamines having from 6 to 12, in particular from 6 to 8, carbon atoms, and also m-xylylenediamine (e.g. Ultramid® X17 from BASF SE, where the molar ratio of MXDA to adipic acid is 1:1), di(4-aminophenyl)methane, di(4-aminocyclohexyl)methane, 2,2-di(4-aminophenyl)propane, 2,2-di(4-aminocyclohexyl)propane, and 1,5-diamino-2-methylpentane.

Preferred polyamides are polyhexamethyleneadipamide, polyhexamethylenesebacamide, and polycaprolactam, and also nylon-6/6,6 copolyamides, in particular having a proportion of from 5 to 95% by weight of caprolactam units (e.g. Ultramid® C31 from BASF SE).

Other suitable polyamides are obtainable from ω-aminoalkylnitriles, e.g. aminocapronitrile (PA 6) and adipodinitrile with hexamethylenediamine (PA 66) via what is known as direct polymerization in the presence of water, for example as described in DE-A 10313681, EP-A 1198491 and EP 922065.

Mention may also be made of polyamides obtainable, by way of example, via condensation of 1,4-diaminobutane with adipic acid at an elevated temperature (nylon-4,6). Preparation processes for polyamides of this structure are described by way of example in EP-A 38 094, EP-A 38 582, and EP-A 39 524.

Other suitable examples are polyamides obtainable via copolymerization of two or more of the abovementioned monomers, and mixtures of two or more polyamides in any desired mixing ratio. Particular preference is given to mixtures of nylon-6,6 with other polyamides, in particular nylon-6/6,6 copolyamides.

Other copolyamides which have proven particularly advantageous are semiaromatic copolyamides, such as PA 6/6T and PA 66/6T, where the triamine content of these is less than 0.5% by weight, preferably less than 0.3% by weight (see EP-A 299 444). Other polyamides resistant to high temperatures are known from EP-A 19 94 075 (PA 6T/6I/MXD6).

The processes described in EP-A 129 195 and 129 196 can be used to prepare the preferred semiaromatic copolyamides with low triamine content.

The following list, which is not comprehensive, comprises the polyamides A) mentioned and other polyamides A) for the purposes of the invention, and the monomers comprised:

AB Polymers:

| | |
|---|---|
| PA 4 | Pyrrolidone |
| PA 6 | ε-Caprolactam |
| PA 7 | Ethanolactam |
| PA 8 | Caprylolactam |
| PA 9 | 9-Aminopelargonic acid |
| PA 11 | 11-Aminoundecanoic acid |
| PA 12 | Laurolactam |

AA/BB Polymers:

| | |
|---|---|
| PA 46 | Tetramethylenediamine, adipic acid |
| PA 66 | Hexamethylenediamine, adipic acid |
| PA 69 | Hexamethylenediamine, azelaic acid |
| PA 610 | Hexamethylenediamine, sebacic acid |
| PA 612 | Hexamethylenediamine, decanedicarboxylic acid |
| PA 613 | Hexamethylenediamine, undecanedicarboxylic acid |
| PA 1212 | 1,12-Dodecanediamine, decanedicarboxylic acid |
| PA 1313 | 1,13-Diaminotridecane, undecanedicarboxylic acid |
| PA 6T | Hexamethylenediamine, terephthalic acid |
| PA 9T | 1,9-Nonanediamine, terephthalic acid |
| PA MXD6 | m-Xylylenediamine, adipic acid |
| PA 6I | Hexamethylenediamine, isophthalic acid |
| PA 6-3-T | Trimethylhexamethylenediamine, terephthalic acid |
| PA 6/6T | (see PA 6 and PA 6T) |
| PA 6/66 | (see PA 6 and PA 66) |
| PA 6/12 | (see PA 6 and PA 12) |
| PA 66/6/610 | (see PA 66, PA 6 and PA 610) |
| PA 6I/6T | (see PA 6I and PA 6T) |
| PA PACM 12 | Diaminodicyclohexylmethane, laurolactam |
| PA 6I/6T/PACM | as PA 6I/6T + diaminodicyclohexylmethane |
| PA 12/MACMI | Laurolactam, dimethyldiaminodicyclohexylmethane, isophthalic acid |
| PA 12/MACMT | Laurolactam, dimethyldiaminodicyclohexylmethane, terephthalic acid |
| PA PDA-T | Phenylenediamine, terephthalic acid |

Preferred flame retardant B) is elemental red phosphorus, in particular in combination with glassfiber-reinforced molding compositions; it can be used in untreated form.

However, particularly suitable preparations are those in which the phosphorus has been surface-coated with low-molecular-weight liquid substances, such as silicone oil, paraffin oil, or esters of phthalic acid (in particular dioctyl phthalate, see EP 176 836) or adipic acid, or with polymeric or oligomeric compounds, e.g. with phenolic resins or amino plastics, or else with polyurethanes (see EP-A 384 232, DE-A 196 48 503). The amounts comprised of these "phlegmatizing agents" are generally from 0.05 to 5% by weight, based on 100% by weight of B).

Concentrates of red phosphorus, e.g. in a polyamide or elastomer, are moreover suitable as flame retardants. In particular, polyolefin homo- and copolymers are suitable as concentrate polymers. However, unless polyamide is used as thermoplastic, the proportion of the concentrate polymer should not amount to more than 35% by weight, based on the weight of components A) and B) in the molding compositions of the invention.

Preferred Concentrate Compositions Are
$B_1$) from 30 to 90% by weight, preferably from 45 to 70% by weight, of a polyamide or elastomer, and
$B_2$) from 10 to 70% by weight, preferably from 30 to 55% by weight, of red phosphorus.

The polyamide used for the masterbatch can differ from A) or preferably can be the same as A), in order to avoid any incompatibility or melting point difference having an adverse effect on the molding composition.

In another process for incorporating the additives C) of the invention, the red phosphorus is suspended in an aqueous solution or suspension of the appropriate additive. This is followed by filtering, washing with water, and drying of the phosphorus thus obtained and surface-wetted with the respective additive C), and drying under inert gas. The modified phosphorus can then be incorporated into thermoplastic molding compositions by using suitable processing machines.

The average particle size ($d_{50}$) of the phosphorus particles dispersed in the molding compositions is preferably in the range from 0.0001 to 0.5 mm; in particular from 0.001 to 0.2 mm.

The content of component B) in the molding compositions of the invention is from 0.1 to 60% by weight, preferably from 0.5 to 40% by weight, and in particular from 1 to 15% by weight, based on the entirety of components A) to E).

The molding compositions of the invention comprise, as component C), from 0.01 to 4% by weight, preferably from 0.1 to 3% by weight, and in particular from 0.1 to 2% by weight, and very particularly preferably from 0.1 to 1.5% by weight, of a Cu(I) salt or Ag(I) oxide or Cu(I) complex or Ag(I) salt or Cu(I) oxide or Ag(I) complex, or a mixture of these.

Suitable Cu(I) complexes or Ag(I) complexes comprise, as ligands, triphenylphosphines, mercaptobenzimidazoles, EDTA, acetylacetonates, glycine, ethylenediamines, oxalates, diethylenetriamines, triethylenetetramines, pyridines, diphosphones and dipyridyls.

These ligands can be used individually or in combination for complex formation. The syntheses required for this purpose are known to the person skilled in the art or are described in the technical literature relating to chemistry of complexes. These complexes can, as usual, also comprise typical inorganic ligands, such as water, chloride, cyano ligands, etc, alongside the abovementioned ligands.

Preference is given to copper complexes with the following ligands in the complex: triphenylphosphines, mercaptobenzimidazoles, acetylacetonates, and glycine. Particular preference is given to triphenylphosphines and mercaptobenzimidazoles.

Preferred copper complexes used in the invention are usually formed via reaction of copper(I) ions with the phosphine compounds and, respectively, mercaptobenzimidazole compounds. These complexes can by way of example be obtained via reaction of triphenylphosphine with a copper (I) halide suspended in chloroform (G. Kosta, E. Reisenhofer, and L. Stafani, J. lnorg. Nukl. Chem. 27 (1965) 2581). However, it is also possible to carry out a reductive reaction of copper(II) compounds with triphenylphosphine, and thus obtain the copper(I) adducts (F. U. Jardine, L. Rule, A. G. Vohrei, J. Chem. Soc. (A) 238-241 (1970)). The person skilled in the art is aware of other processes.

In principle, all alkyl- or arylphosphines are suitable. Examples of phosphines that can be used in the invention are triphenylphosphine, and also the substituted triphenylphosphines, trialkylphosphines, and also diarylphosphines. An example of a suitable trialkylphosphine is tris(n-butyl)phosphine. Triphenylphosphine is especially preferred for economic reasons because of its commercial availability. However, the triphenylphosphine complexes are generally more stable than the trialkylphosphine complexes.

Examples of suitable complexes can be represented by the following formulae:
[Cu(PPh$_3$)$_3$X], [Cu$_2$X$_2$(PPh$_3$)$_3$], [Cu(PPh$_3$)X]$_4$, and also [Cu (PPh$_3$)$_2$X], where X is selected from Cl, Br, I, CN, SCN, or 2-mercaptobenzimidazole, particular preference being given here to Cu(I)(PPh$_3$)$_2$I.

However, complexes that can be used in the invention can also comprise further ligands in the complex. Examples here are bipyridyl (e.g. CuX (PPh$_3$) (bipy), where X is Cl, Br, or I), biquinoline (e.g. CuX (PPh$_3$)·(biquin), where Xis Cl, Br, or I), and also 1,10-phenanthroline, o-phenylenebis(dimenthylarsine), 1,2-bis(diphenylphosphino)ethane, and terpyridyl.

Other preferred compounds of Cu and Ag in the oxidation state I are the oxides Cu$_2$O, Ag$_2$O, thiocyanates CuSCN, AgSCN, halides CuCl, AgCl, CuBr, AgBr, preference being given here to Cul, Agl, CuSCN, and/or CuCl.

Carboxylates of monovalent copper or silver that can be used, in particular having from 1 to 6 carbon atoms, are preferably acetates, oxalates, stearates, propionates, butyrates, or benzoates, preference being given here to acetates and/or oxalates.

It is particularly preferable that component C) is present in a mixture with an alkali metal halide, preferably KI, where the mixing ratio is from 1:10 to 1:1.

Very particularly preferred Cu compounds C) alongside the oxides are Cul, in particular in a mixture with KI in the ratio 1:4, and bistriphenylphosphinecopper iodide, in particular in a mixture with KI in the ratio 1:2.

Very particularly preferred Ag compounds C) are moreover Ag$_2$O and/or AgCl.

The molding compositions comprise, as component D), amounts of from 0 to 40% by weight, preferably from 1 to 30% by weight, in particular from 2 to 20% by weight, of elastomeric polymers (often also termed impact modifiers, elastomers, or rubbers).

These materials very generally involve copolymers, preferably composed of at least two of the following monomers: ethylene, propylene, butadiene, isobutene, isoprene, chloroprene, vinyl acetate, styrene, acrylonitrile, and (meth)acrylates having from 1 to 18 carbon atoms in the alcohol component.

Polymers of this type are described by way of example in Houben-Weyl, Methoden der organischen Chemie, volume 14/1 (Georg-Thieme-Verlag, Stuttgart, 1961), pp 392 to 406, and in the monograph "Toughened Plastics" by C. B. Bucknall (Applied Science Publishers, London, 1977).

Some preferred types of these elastomers are described below.

Preferred types of these elastomers are those known as ethylene-propylene (EPM) and ethylene-propylene-diene (EPDM) rubbers.

EPM rubbers generally have practically no residual double bonds, whereas EPDM rubbers may have from 1 to 20 double bonds per 100 carbon atoms.

Examples which may be mentioned of diene monomers for EPDM rubbers are conjugated dienes, such as isoprene and butadiene, non-conjugated dienes having from 5 to 25 carbon atoms, such as 1,4-pentadiene, 1,4-hexadiene, 1,5-hexadiene, 2,5-dimethyl-1,5-hexadiene and 1,4-octadiene, cyclic dienes, such as cyclopentadiene, cyclohexadienes, cyclooctadienes and dicyclopentadiene, and also alkenylnorbornenes, such as 5-ethylidene-2-norbornene, 5-butylidene-2-norbornene, 2-methallyl-5-norbornene and 2-isopropenyl-5-norbornene, and tricyclodienes, such as 3-methyltricyclo[5.2.1.0.2.6]-3,8-decadiene, and mixtures of these.

Preference is given to 1,5-hexadiene, 5-ethylidenenorbornene and dicyclopentadiene. The diene content of the EPDM rubbers is preferably from 0.5 to 50% by weight, in particular from 1 to 8% by weight, based on the total weight of the rubber.

EPM rubbers and EPDM rubbers may preferably also have been grafted with reactive carboxylic acids or with derivatives of these. Examples of these are acrylic acid, methacrylic acid and derivatives thereof, e.g. glycidyl(meth) acrylate, and also maleic anhydride.

Copolymers of ethylene with acrylic acid and/or methacrylic acid and/or with the esters of these acids are another group of preferred rubbers. The rubbers may also comprise dicarboxylic acids, such as maleic acid and fumaric acid, or derivatives of these acids, e.g. esters and anhydrides, and/or monomers comprising epoxy groups. These monomers comprising dicarboxylic acid derivatives or comprising epoxy groups are preferably incorporated into the rubber by adding to the monomer mixture monomers comprising dicarboxylic acid groups and/or epoxy groups and having the general formulae I or II or III or IV

$$R^1C(COOR^2)=C(COOR^3)R^4 \quad (I)$$

(II)

(III)

(IV)

where R$^1$ to R$^9$ are hydrogen or alkyl groups having from 1 to 6 carbon atoms, and m is a whole number from 0 to 20, g is a whole number from 0 to 10 and p is a whole number from 0 to 5.

The radicals R¹ to R⁹ are preferably hydrogen, where m is 0 or 1 and g is 1. The corresponding compounds are maleic acid, fumaric acid, maleic anhydride, allyl glycidyl ether and vinyl glycidyl ether.

Preferred compounds of the formulae I, II and IV are maleic acid, maleic anhydride and (meth)acrylates comprising epoxy groups, such as glycidyl acrylate and glycidyl methacrylate, and the esters with tertiary alcohols, such as tert-butyl acrylate. Although the latter have no free carboxy groups, their behavior approximates to that of the free acids and they are therefore termed monomers with latent carboxy groups.

The copolymers are advantageously composed of from 50 to 98% by weight of ethylene, from 0.1 to 20% by weight of monomers comprising epoxy groups and/or methacrylic acid and/or monomers comprising anhydride groups, the remaining amount being (meth)acrylates.

Particular preference is given to copolymers composed of
from 50 to 98% by weight, in particular from 55 to 95% by weight, of ethylene,
from 0.1 to 40% by weight, in particular from 0.3 to 20% by weight, of glycidyl acrylate and/or glycidyl methacrylate, (meth)acrylic acid and/or maleic anhydride, and
from 1 to 45% by weight, in particular from 5 to 40% by weight, of n-butyl acrylate and/or 2-ethylhexyl acrylate.

Other preferred (meth)acrylates are the methyl, ethyl, propyl, isobutyl and tert-butyl esters.

Comonomers which may be used alongside these are vinyl esters and vinyl ethers.

The ethylene copolymers described above may be produced by processes known per se, preferably by random copolymerization at high pressure and elevated temperature. Appropriate processes are well-known.

Other preferred elastomers are emulsion polymers whose preparation is described, for example, in Blackley's monograph "Emulsion Polymerization". The emulsifiers and catalysts which can be used are known per se.

In principle it is possible to use homogeneously structured elastomers or else those with a shell structure. The shell-type structure is determined by the sequence of addition of the individual monomers. The morphology of the polymers is also affected by this sequence of addition.

Monomers which may be mentioned here, merely as examples, for the preparation of the rubber fraction of the elastomers are acrylates, such as n-butyl acrylate and 2-ethylhexyl acrylate, corresponding methacrylates, butadiene and isoprene, and also mixtures of these. These monomers may be copolymerized with other monomers, such as styrene, acrylonitrile, vinyl ethers and with other acrylates or methacrylates, such as methyl methacrylate, methyl acrylate, ethyl acrylate or propyl acrylate.

The soft or rubber phase (with a glass transition temperature of below 0° C.) of the elastomers may be the core, the outer envelope or an intermediate shell (in the case of elastomers whose structure has more than two shells). Elastomers having more than one shell may also have more than one shell composed of a rubber phase.

If one or more hard components (with glass transition temperatures above 20° C.) are involved, besides the rubber phase, in the structure of the elastomer, these are generally produced by polymerizing, as principal monomers, styrene, acrylonitrile, methacrylonitrile, α-methylstyrene, p-methylstyrene, or acrylates or methacrylates, such as methyl acrylate, ethyl acrylate or methyl methacrylate. Besides these, it is also possible to use relatively small proportions of other comonomers.

It has proven advantageous in some cases to use emulsion polymers which have reactive groups at their surfaces. Examples of groups of this type are epoxy, carboxy, latent carboxy, amino and amide groups, and also functional groups which may be introduced by concomitant use of monomers of the general formula

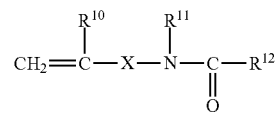

where the substituents can be defined as follows:
$R^{10}$ is hydrogen or a $C_1$-$C_4$-alkyl group,
$R^{11}$ is hydrogen, a $C_1$-$C_8$-alkyl group or an aryl group, in particular phenyl,
$R^{12}$ is hydrogen, a $C_1$-$C_{10}$-alkyl group, a $C_6$-$C_{12}$-aryl group, or —$OR^{13}$,
$R^{13}$ is a $C_1$-$C_8$-alkyl group or a $C_6$-$C_{12}$-aryl group, which can optionally have substitution by groups that comprise O or by groups that comprise N,
X is a chemical bond, a $C_1$-$C_{10}$-alkylene group, or a $C_6$-$C_{12}$-arylene group, or

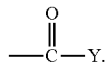

Y is O—Z or NH—Z, and
Z is a $C_1$-$C_{10}$-alkylene or $C_6$-$C_{12}$-arylene group.

The graft monomers described in EP-A 208 187 are also suitable for introducing reactive groups at the surface.

Other examples which may be mentioned are acrylamide, methacrylamide and substituted acrylates or methacrylates, such as (N-tert-butylamino)ethyl methacrylate, (N,N-dimethylamino)ethyl acrylate, (N,N-dimethylamino)methyl acrylate and (N,N-diethylamino)ethyl acrylate.

The particles of the rubber phase may also have been crosslinked. Examples of crosslinking monomers are 1,3-butadiene, divinylbenzene, diallyl phthalate and dihydrodicyclopentadienyl acrylate, and also the compounds described in EP-A 50 265.

It is also possible to use the monomers known as graft-linking monomers, i.e. monomers having two or more polymerizable double bonds which react at different rates during the polymerization. Preference is given to the use of compounds of this type in which at least one reactive group polymerizes at about the same rate as the other monomers, while the other reactive group (or reactive groups), for example, polymerize(s) significantly more slowly. The different polymerization rates give rise to a certain proportion of unsaturated double bonds in the rubber. If another phase is then grafted onto a rubber of this type, at least some of the double bonds present in the rubber react with the graft monomers to form chemical bonds, i.e. the phase applied by grafting has at least some degree of chemical bonding to the graft base.

Examples of graft-linking monomers of this type are monomers comprising allyl groups, in particular allyl esters of ethylenically unsaturated carboxylic acids, for example allyl acrylate, allyl methacrylate, diallyl maleate, diallyl fumarate and diallyl itaconate, and the corresponding monoallyl compounds of these dicarboxylic acids. Besides these there is a wide variety of other suitable graft-linking monomers. For further details reference may be made here, for example, to U.S. Pat. No. 4,148,846.

The proportion of these crosslinking monomers in the impact-modifying polymer is generally up to 5% by weight, preferably not more than 3% by weight, based on the impact-modifying polymer.

Some preferred emulsion polymers are listed below. Mention may first be made here of graft polymers with a core and with at least one outer shell, and having the following structure:

| Type | Monomers for the core | Monomers for the envelope |
|---|---|---|
| I | 1,3-butadiene, isoprene, n-butyl acrylate, ethylhexyl acrylate, or a mixture of these | styrene, acrylonitrile, methyl methacrylate |
| II | as I, but with concomitant use of crosslinking agents | as I |
| III | as I or II | n-butyl acrylate, ethyl acrylate, methyl acrylate, 1,3-butadiene, isoprene, ethylhexyl acrylate |
| IV | as I or II | as I or III, but with concomitant use of monomers having reactive groups, as described herein |
| V | styrene, acrylonitrile, methyl methacrylate, or a mixture of these | first envelope composed of monomers as described under I and II for the core, second envelope as described under I or IV for the envelope |

Instead of graft polymers whose structure has more than one shell, it is also possible to use homogeneous, i.e. single-shell, elastomers composed of 1,3-butadiene, isoprene and n-butyl acrylate or of copolymers of these. These products, too, may be produced by concomitant use of crosslinking monomers or of monomers having reactive groups.

Examples of preferred emulsion polymers are n-butyl acrylate-(meth)acrylic acid copolymers, n-butyl acrylate-glycidyl acrylate or n-butyl acrylate-glycidyl methacrylate copolymers, graft polymers with an inner core composed of n-butyl acrylate or based on butadiene and with an outer envelope composed of the abovementioned copolymers, and copolymers of ethylene with comonomers which supply reactive groups.

The elastomers described may also be produced by other conventional processes, e.g. by suspension polymerization.

Preference is also given to silicone rubbers, as described in DE-A 37 25 576, EP-A 235 690, DE-A 38 00 603 and EP-A 319 290.

Particularly preferred rubbers D) are ethylene copolymers as described above which comprise functional monomers, where the functional monomers are those selected from the group of the carboxylic acid, carboxylic anhydride, carboxylic ester, carboxamide, carboximide, amino, hydroxy, epoxy, urethane, or oxazoline groups, or a mixture of these.

The content of the functional groups is from 0.1 to 20% by weight, preferably from 0.2 to 10% by weight, and in particular from 0.3 to 7% by weight, based on 100% by weight of D).

Particularly preferred monomers are those composed of an ethylenically unsaturated mono- or dicarboxylic acid or of a functional derivative of such an acid.

In principle, any of the primary, secondary, or tertiary $C_1$-$C_{18}$-alkyl (meth)acrylates is suitable, but preference is given to esters having from 1 to 12 carbon atoms, in particular having from 2 to 10 carbon atoms.

Examples here are methyl, ethyl, propyl, n-butyl, isobutyl and tert-butyl, 2-ethylhexyl, octyl and decyl acrylates, and the corresponding methacrylates. Among these, particular preference is given to n-butyl acrylate and 2-ethylhexyl acrylate.

The olefin polymers can also comprise, instead of the esters, or in addition to these, acid-functional and/or latently acid-functional monomers of ethylenically unsaturated mono- or dicarboxylic acids, or monomers having epoxy groups.

Other examples of monomers that may be mentioned are acrylic acid, methacrylic acid, tertiary alkyl esters of these acids, in particular tert-butyl acrylate, and dicarboxylic acids, such as maleic acid and fumaric acid, and derivatives of said acids, and also monoesters of these.

Latently acid-functional monomers are compounds which, under the conditions of polymerization or during incorporation of the olefin polymers into the molding compositions, form free acid groups. Examples that may be mentioned here are anhydrides of dicarboxylic acids having up to 20 carbon atoms, in particular maleic anhydride, and tertiary $C_1$-$C_{12}$-alkyl esters of the abovementioned acids, in particular tert-butyl acrylate and tent-butyl methacrylate.

The acid-functional or latently acid-functional monomers and the monomers comprising epoxy groups are preferably incorporated into the olefin polymers through addition of compounds of the general formulae I-IV to the monomer mixture.

The melt index of the ethylene copolymers is generally in the range from 1 to 80 g/10 min (measured at 190° C. with 2.16 kg load). The molar mass of said ethylene-α-olefin copolymers is from 10 000 to 500 000 g/mol, preferably from 15 000 to 400 000 g/mol (Mn, determined by means of GPC in 1,2,4-trichloro-benzene with PS calibration).

One particular embodiment uses ethylene-α-olefin copolymers produced by means of "single site catalysts". Further details can be found in U.S. Pat. No. 5,272,236. In this case, the ethylene-α-olefin copolymers have a molecular weight distribution which is narrow for polyolefins: smaller than 4, and preferably smaller than 3.5.

Preferred commercially available products B used are Exxelor® VA 1801, or 1803, Kraton® G 1901 FX, or Fusabond® N NM493 D, or Fusabond® A560 from Exxon, Kraton, and DuPont, and also Tafmer®MH 7010 from Mitsui.

It is also possible, of course, to use a mixture of the types of rubber listed above.

The molding compositions of the invention can comprise, as component E), up to 60% by weight, preferably up to 50% by weight, of further additional substances.

Fibrous or particulate fillers E) that may be mentioned are carbon fibers, glass fibers, glass beads, amorphous silica, calcium silicate, calcium metasilicate, magnesium carbonate, kaolin, chalk, powdered quartz, mica, barium sulfate, and feldspar, and the amounts of these that can be used are from 1 to 50% by weight, in particular from 5 to 40% by weight, preferably from 10 to 40% by weight.

Preferred fibrous fillers that may be mentioned are carbon fibers, aramid fibers, and potassium titanate fibers, particular preference being given to glass fibers in the form of E glass. These can be used as rovings or in the commercially available forms of chopped glass.

The fibrous fillers may have been surface-pretreated with a silane compound to improve compatibility with the thermoplastics.

Suitable silane compounds have the general formula:

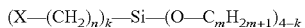

where the definitions of the substituents are as follows:

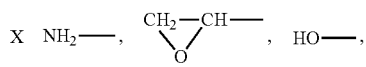

n is a whole number from 2 to 10, preferably 3 to 4,
m is a whole number from 1 to 5, preferably 1 to 2, and
k is a whole number from 1 to 3, preferably 1.

Preferred silane compounds are aminopropyltrimethoxysilane, aminobutyltrimethoxysilane, aminopropyltriethoxysilane and aminobutyltriethoxysilane, and also the corresponding silanes which comprise a glycidyl group as substituent X.

The amounts of the silane compounds generally used for surface-coating are from 0.01 to 2% by weight, preferably from 0.025 to 1.0% by weight and in particular from 0.05 to 0.5% by weight (based on E)).

Acicular mineral fillers are also suitable.

For the purposes of the invention, acicular mineral fillers are mineral fillers with strongly developed acicular character. An example is acicular wollastonite. The mineral preferably has an L/D (length to diameter) ratio of from 8:1 to 35:1, preferably from 8:1 to 11:1. The mineral filler may, if appropriate, have been pretreated with the abovementioned silane compounds, but the pretreatment is not essential.

Other fillers which may be mentioned are kaolin, calcined kaolin, wollastonite, talc and chalk, and also lamellar or acicular nanofillers, the amounts of these preferably being from 0.1 to 10%. Materials preferred for this purpose are boehmite, bentonite, montmorillonite, vermiculite, hectorite, and laponite. The lamellar nanofillers are organically modified by prior-art methods, to give them good compatibility with the organic binder. Addition of the lamellar or acicular nanofillers to the inventive nanocomposites gives a further increase in mechanical strength.

The molding compositions of the invention can comprise, as component E), from 0.05 to 3% by weight, preferably from 0.1 to 1.5% by weight, and in particular from 0.1 to 1% by weight, of a lubricant.

Preference is given to the salts of Al, of alkali metals, or of alkaline earth metals, or esters or amides of fatty acids having from 10 to 44 carbon atoms, preferably having from 12 to 44 carbon atoms.

The metal ions are preferably alkaline earth metal and Al, particular preference being given to Ca or Mg.

Preferred metal salts are Ca stearate and Ca montanate, and also Al stearate.

It is also possible to use a mixture of various salts, in any desired mixing ratio.

The carboxylic acids can be monobasic or dibasic. Examples which may be mentioned are pelargonic acid, palmitic acid, lauric acid, margaric acid, dodecanedioic acid, behenic acid, and particularly preferably stearic acid, capric acid, and also montanic acid (a mixture of fatty acids having from 30 to 40 carbon atoms).

The aliphatic alcohols can be monohydric to tetrahydric. Examples of alcohols are n-butanol, n-octanol, stearyl alcohol, ethylene glycol, propylene glycol, neopentyl glycol, pentaerythritol, preference being given to glycerol and pentaerythritol.

The aliphatic amines can be mono- to tribasic. Examples of these are stearylamine, ethylenediamine, propylenediamine, hexamethylenediamine, di(6-aminohexyl)amine, particular preference being given to ethylenediamine and hexamethylenediamine. Preferred esters or amides are correspondingly glycerol distearate, glycerol tristearate, ethylenediamine distearate, glycerol monopalmitate, glycerol trilaurate, glycerol monobehenate, and pentaerythritol tetrastearate.

It is also possible to use a mixture of various esters or amides, or of esters with amides in combination, in any desired mixing ratio.

The molding compositions of the invention can comprise, as component E), amounts of from 0.01 to 2% by weight, preferably from 0.1 to 1.5% by weight, of what are known as acid scavengers for the red phosphorus.

Suitable acid scavengers are ZnO, Zn borate, Zn stannate, MgO, Mg(OH)$_2$, ZnCO$_3$, MgCO$_3$, CaCO$_3$, Mg Ca carbonates, and AlOOH, particular preference being given here to ZnO, basic ZnCO$_3$, Mg(OH)$_2$, and CaCO$_3$.

Suitable sterically hindered phenols E) are in principle all of the compounds which have a phenolic structure and which have at least one bulky group on the phenolic ring.

Examples of compounds that can be used with preference are those of the formula

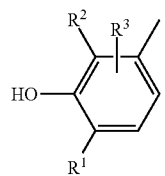

where:

$R^1$ and $R^2$ are an alkyl group, a substituted alkyl group, or a substituted triazole group, and where the radicals $R^1$ and $R^2$ may be identical or different, and $R^3$ is an alkyl group, a substituted alkyl group, an alkoxy group, or a substituted amino group.

Antioxidants of the abovementioned type are described by way of example in DE-A 27 02 661 (U.S. Pat. No. 4,360,617).

Another group of preferred sterically hindered phenols is provided by those derived from substituted benzenecarboxylic acids, in particular from substituted benzenepropionic acids.

Particularly preferred compounds from this class are compounds of the formula

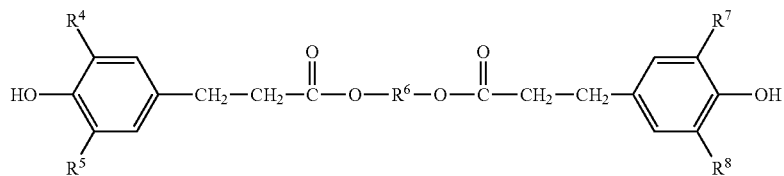

where $R^4$, $R^5$, $R^7$, and $R^8$, independently of one another, are $C_1$-$C_8$-alkyl groups which themselves may have substitution (at least one of these being a bulky group), and $R^6$ is a divalent aliphatic radical which has from 1 to 10 carbon atoms and whose main chain may also have C—O bonds.

Preferred compounds corresponding to this formula are

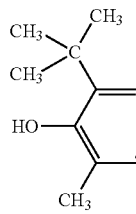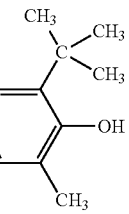

(Irganox® 245 from BASF SE)

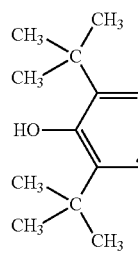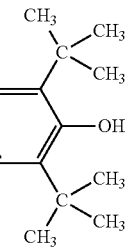

(Irganox® 259 from BASF SE)

All of the following should be mentioned as examples of sterically hindered phenols:
2,2'-methylenebis(4-methyl-6-tert-butylphenol), 1,6-hexanediol bis[3-(3,5-di-tert-butyl-4-hydroxyphenyl)propionate], pentaerythrityl tetrakis[3-(3,5-di-tert-butyl-4-hydroxyphenyl)propionate], distearyl 3,5-di-tert-butyl-4-hydroxybenzylphosphonate, 2,6,7-trioxa-1-phosphabicyclo[2.2.2]oct-4-ylmethyl 3,5-di-tert-butyl-4-hydroxyhydrocinnamate, 3,5-di-tert-butyl-4-hydroxyphenyl-3,5-distearylthiotriazylamine, 2-(2'-hydroxy-3'-hydroxy-3',5'-di-tent-butylphenyl)-5-chlorobenzotriazole, 2,6-di-tert-butyl-4-hydroxymethylphenol, 1,3,5-trimethyl-2,4,6-tris(3,5-di-tert-butyl-4-hydroxybenzyl)benzene, 4,4'-methylenebis(2,6-di-tert-butylphenol), 3,5-di-tert-butyl-4-hydroxybenzyldimethylamine.

Compounds which have proven particularly effective and which are therefore used with preference are 2,2'-methylenebis(4-methyl-6-tert-butylphenol), 1,6-hexanediol bis(3, 5-di-tert-butyl-4-hydroxyphenyl)propionate (Irganox® 259), pentaerythrityl tetrakis[3-(3,5-di-tert-butyl-4-hydroxyphenyl)propionate], and also N,N'-hexamethylenebis-3,5-di-tert-butyl-4-hydroxyhydrocinnamide (Irganox® 1098), and the product Irganox® 245 described above from BASF SE, which has particularly good suitability.

The amount comprised of the antioxidants E), which can be used individually or as a mixture, is from 0.05 up to 3% by weight, preferably from 0.1 to 1.5% by weight, in particular from 0.1 to 1% by weight, based on the total weight of the molding compositions A) to E).

In some instances, sterically hindered phenols having not more than one sterically hindered group in ortho-position with respect to the phenolic hydroxy group have proven particularly advantageous; in particular when assessing colorfastness on storage in diffuse light over prolonged periods.

The molding compositions of the invention can comprise, as component E), from 0.05 to 5% by weight, preferably from 0.1 to 2% by weight, and in particular from 0.25 to 1.5% by weight, of a nigrosin.

Nigrosins are generally a group of black or gray phenazine dyes (azine dyes) related to the indulines and taking various forms (water-soluble, liposoluble, spirit-soluble), used in wool dyeing and wool printing, in black dyeing of silks, and in the coloring of leather, of shoe creams, of varnishes, of plastics, of stoving lacquers, of inks, and the like, and also as microscopy dyes.

Nigrosins are obtained industrially via heating of nitrobenzene, aniline, and aniline hydrochloride with metallic iron and $FeCl_3$ (the name being derived from the Latin niger=black).

Component E) can be used in the form of free base or else in the form of salt (e.g. hydrochloride).

Further details concerning nigrosins can be found by way of example in the electronic encyclopedia Rompp Online, Version 2.8, Thieme-Verlag Stuttgart, 2006, keyword "Nigrosin".

The molding compositions of the invention can comprise, as component E), from 0 to 20% by weight, preferably from 1 to 15% by weight, and in particular from 5 to 15% by weight, of a nitrogen-containing flame retardant, preferably a melamine compound.

Suitable compounds (often also termed salts or adducts) are melamine sulfate, melamine, melamine borate, melamine oxalate, melamine phosphate prim., melamine phosphate sec., and melamine pyrophosphate sec., melamine neopentyl glycol borate, and polymeric melamine phosphate (CAS No. 56386-64-2 and 218768-84-4).

Preference is given to melamine polyphosphate salts derived from a 1,3,5-triazine compound of which the number n for the average degree of condensation is from 20 to 200, and 1,3,5-triazine content, per mole of phosphorus atom, is from 1.1 to 2.0 mol of a 1,3,5-triazine compound selected from the group consisting of melamine, melam, melem, melon, ammeline, ammelide, 2-ureidomelamine, acetoguanamine, benzoguanamine, and diaminophenyltriazine. It is preferable that the n value for salts of this type is generally from 40 to 150 and that the 1,3,5-triazine compound:mole of phosphorus atom ratio is from 1.2 to 1.8. The pH of a 10% by weight aqueous slurry of salts, produced as in EP1095030B1, is moreover generally more than 4.5, and preferably at least 5.0. The pH is usually determined by adding 25 g of the salt and 225 g of clean water at 25° C. to a 300 ml beaker, stirring the resultant aqueous slurry for 30 minutes and then measuring the pH. The abovementioned n value, the number-average degree of condensation, can be determined by means of $^{31}$P solid-state NMR. J. R. van Wazer, C. F. Callis, J. Shoolery, and R. Jones, J. Am. Chem. Soc., 78, 5715, 1956, disclose that there is a unique type of chemical shift that reveals the number of adjacent phosphate groups and permits clear differentiation between orthophosphates, pyrophosphates, and polyphosphates. EP1095030B1 moreover describes a process which can produce the desired polyphosphate salt of a 1,3,5-triazine compound which has an n value of from 20 to 200 and has from 1.1 to 2.0 mol 1,3,5-triazine content of a 1,3,5-triazine compound.

Said process comprises the conversion of a 1,3,5-triazine compound into its orthophosphate salt by orthophosphoric acid, with subsequent dehydration and heat treatment, in order to convert the orthophosphate salt into a polyphosphate of the 1,3,5-triazine compound. Said heat treatment is preferably carried out at a temperature of at least 300° C., and preferably at at least 310° C. In addition to orthophosphates of 1,3,5-triazine compounds it is equally possible to use other 1,3,5-triazine phosphates, inclusive by way of example of a mixture of orthophosphates and pyrophosphates.

Preference is given to aluminum phosphite [$Al(H_2PO_3)_3$], secondary aluminum phosphite [$Al_2(HPO_3)_3$], basic aluminum phosphite [$Al(OH)(H_2PO_3)_2*2aq$], aluminum phosphite tetrahydrate [$Al_2(HPO_3)_3*4aq$], aluminum phosphonate, $Al_7(HPO_3)_9(OH)_6(1,6\text{-hexanediamine})_{1.5}*12H_2O$, $Al_2(HPO_3)^3*xAl_2O_3*nH_2O$, where x=2.27-1, and/or $Al_4H_6P_{16}O_{18}$ (see WO2012/45414).

A person skilled in the art is aware of other suitable nitrogen-containing flame retardants.

The thermoplastic molding compositions of the invention can comprise, as component E), conventional processing aids, such as stabilizers, oxidation retarders, agents to counteract decomposition by heat and decomposition by ultraviolet light, lubricants and mold-release agents, colorants, such as dyes and pigments, nucleating agents, plasticizers, etc.

Examples of oxidation retarders and heat stabilizers are sterically hindered phenols and/or phosphites and amines (e.g. TAD), hydroquinones, aromatic secondary amines, such as diphenylamines, various substituted members of these groups, and mixtures of these, in concentrations of up to 1% by weight, based on the weight of the thermoplastic molding compositions.

UV stabilizers that may be mentioned, the amounts of which used are generally up to 2% by weight, based on the molding composition, are various substituted resorcinols, salicylates, benzotriazoles, and benzophenones.

Materials that can be added as colorants are inorganic pigments, such as titanium dioxide, ultramarine blue, iron oxide, and carbon black, and also organic pigments, such as phthalocyanines, quinacridones, perylenes, and also dyes, such as anthraquinones.

Materials that can be used as nucleating agents are sodium phenylphosphinate, aluminum oxide, silicon dioxide, and also preferably talc powder.

The thermoplastic molding compositions of the invention can be produced by processes known per se, by mixing the starting components in conventional mixing apparatus, such as screw-based extruders, Brabender mixers, or Banbury mixers, and then extruding the same. The extrudate can be cooled and pelletized. It is also possible to premix individual components and then to add the remaining starting materials individually and/or likewise in the form of a mixture. The mixing temperatures are generally from 230 to 320° C.

In another preferred mode of operation, components B) and C), and also optionally D) and E), can be mixed with a prepolymer, compounded and pelletized. The resultant pellets are then solid-phase condensed under inert gas continuously or batchwise at a temperature below the melting point of component A) until the desired viscosity is reached.

The thermoplastic molding compositions of the invention feature good flame retardancy and excellent phosphorus stability and UV resistance.

The molding compositions of the invention exhibit markedly reduced reddish coloring, and the use of component C) in conjunction with red phosphorus gives the compounded material, and the moldings obtainable therefrom, a gray intrinsic color. These are therefore also suitable for applications requiring a pale intrinsic color or a pale coloring (white or gray).

The use, in the invention, of Cu compounds and/or Ag compounds according to claim 1 leads to the production of molding compositions according to claim 1, or moldings according to claim 10, which exhibit increased UV resistance and reduced phosphine formation.

The use, in the invention, of Cu compounds and/or Ag compounds according to claim 1 leads to the production of molding compositions according to claim 1, or moldings according to claim 10, with ΔL color values at least 15% lower than those of PA molding compositions without component C) according to claim 1 (in accordance with DIN 53236 and ISO 7724-3, CieLab method), and also to Δa color values that are 35% lower and to Δb color values that are at least 35% lower.

The phosphorus release values (28 days/70° C.) are below 200 μg of P/specimen, preferably below 160 μg of P/specimen.

These materials are therefore suitable for producing fibers, foils, and moldings of any type. Some examples will now be mentioned: plug connectors, plugs, plug parts, cable-harness components, circuit mounts, circuit-mount components, three-dimensionally injection-molded circuit mounts, electrical connectors, and mechatronic components.

The moldings or semifinished products to be produced in the invention from the thermoplastic molding compositions can be used by way of example in the motor vehicle industry, electrical industry, electronics industry, telecommunications industry, information-technology industry, consumer-electronics industry, or computer industry, in vehicles and other means of conveyance, in ships, in spacecraft, in the household, in office equipment, in sports, in medicine, and also generally in articles and parts of buildings which require increased fire protection.

Possible uses of improved-flow polyamides in the kitchen and household sector are for the production of components for kitchen devices, e.g. fryers, smoothing irons, knobs, and also applications in the garden and leisure sector.

EXAMPLES

The following components were used:
Component A/1
Nylon-6,6 with intrinsic viscosity IV 150 ml/g, measured as a 0.5% by weight solution in 96% by weight sulfuric acid at 25° C. in accordance with ISO 307. (Ultramid® A27 from BASF SE was used.)
Component A/2
PA 66 with IV 125 ml/g (Ultramid® A24 from BASF SE)
Component B/1
50% strength concentrate of red phosphorus with average particle size ($d_{50}$) from 10 to 30 μm in an olefin polymer of: 59.8% by weight of ethylene, 35% by weight of n-butyl acrylate, 4.5% by weight of acrylic acid, and 0.7% by weight of maleic anhydride (component D) with melt flow index MFI 10 g/10 min (190/2.16). The copolymer was produced via copolymerization of the monomers at elevated temperature and elevated pressure.
Component B/2
$P_{red}$ (see above) without elastomer D)
Component C/1
Copper iodide
Component C/2
bis(Triphenylphosphine)copper iodide complex CAS No.: 16109-82-3
Component E/1:
Standard chopped glass fiber for polyamides, length=4.5 mm, diameter=10 μm.
Component E/2:
N,N'-Hexamethylenebis-3,5-di-tert-butyl-4-hydroxyhydrocinnamide (Irganox® 1098)
Component E/3:
Ca stearate
Component E/4
ZnO Production of the Molding Compositions In order to provide evidence of the phosphorus stability improvements described in the invention, appropriate plastics molding compositions were manufactured via compounding. To this end, the individual components were mixed in a ZSK 26 (Berstorff) twin-screw extruder with throughput 20 kg/h and a flat temperature profile at about 270° C., extruded in the form of strand, cooled until pelletizable, and pelletized.

The test specimens for the studies set out in table 1 were injection-molded in an Arburg 420 C injection-molding machine at a melt temperature of about 270° C. and mold temperature of about 80° C. In the examples of the invention, component C) was applied to the dried pellets in the form of powder in a drum.

Testing of Plastics Parts for Phosphorus Release:
A specimen of plastic (125×12.5×1.6 mm) was halved, and each half was placed in a 10 ml glass beaker. A silver contact material (10×50×0.125 mm) was placed in a short test tube. The three specimens were then placed in a 100 ml screw-cap bottle, 5 ml of water were added, and the sealed system was placed in a drying oven at 70° C. After 28 days, the test tube was removed and filled to the top with water, and the entire contents were placed in a glass beaker. 5 ml of conc. hydrochloric acid were added, and the mixture was evaporated almost to dryness. The metal specimen was then removed and rinsed with water; 1 ml of sulfuric acid was admixed with the residue, and the mixture was again evaporated almost to dryness. 20 ml of water are then used for dilution, 4 ml of 5% strength potassium peroxodisulfate solution are added, and the mixture is heated for 30 minutes. The phosphorus was then determined photometrically by using molybdenum blue, in μg of phosphorus/specimen of plastic.

Color Measurement:
Color was measured in accordance with DIN 53236:1983, method B. The calculation method used was in accordance with DIN 6174:1979, which is identical with ISO 7724-3, this being what is known as the CieLab method:
L*=Lightness; +is whiter; −is blacker
a*=Color components; +redder; −greener
b*=Color components; +yellower; −bluer.
The value zero means no color=uncolored=colorless.
C*ab=Chroma (uncolored/colored); h° ab=Hue angle (from 0 to 360°).
Evaluation of all of L*, a*, and b* produces the color difference ΔE*.
The CTI value was determined in accordance with IEC 60112.
Table 1 shows the constitutions of the uncolored molding compositions and the results of the measurements.

TABLE 1

| Component | comp 1* | INV1 | INV2 | INV3 | INV4 | INV5 | INV6 |
|---|---|---|---|---|---|---|---|
| A/1 | 60.6 | 60.4 | 60.1 | 59.6 | 60.4 | 60.1 | 59.6 |
| B/1 | 12 | 12 | 12 | 12 | 12 | 12 | 12 |
| C/1 | | | | | 0.2 | 0.5 | 1.0 |
| C/2 | | 0.2 | 0.5 | 1.0 | | | |
| E/1 | 26 | 26 | 26 | 26 | 26 | 26 | 26 |
| E/2 + E/3 (50:50) | 0.7* | 0.7* | 0.7* | 0.7* | 0.7* | 0.7* | 0.7* |
| E/4 | 0.7 | 0.7 | 0.7 | 0.7 | 0.7 | 0.7 | 0.7 |
| Color measurement/delta L | 31.3 | 26.5 | 24.0 | 19.7 | 20.4 | 18.0 | 17.3 |
| Color measurement/delta a | 29.1 | 19.1 | 14.1 | 6.7 | 9.5 | 2.3 | 0.54 |
| Color measurement/delta b | 22.8 | 15.1 | 10.6 | 4.0 | 6.3 | 0.8 | 0.10 |
| Modulus of elasticity/[MPa] | 8090 | 8050 | 8041 | 8073 | 8080 | 8101 | 8204 |
| Tensile stress at break/[MPa] | 130 | 132 | 134 | 133 | 131 | 133 | 136 |

TABLE 1-continued

| Component | comp 1* | INV1 | INV2 | INV3 | INV4 | INV5 | INV6 |
|---|---|---|---|---|---|---|---|
| Tensile strain at break/[%] | 3.6 | 3.2 | 3.1 | 3.2 | 3.6 | 3.6 | 3.5 |
| CTI/[V] | open | open | open | open | open | open | open |
| Phosphorus release after 28 days/70° C. in µg of phosphorus/specimen | 480 | 150 | 60 | 54 | 8 | 5 | 2 |

*for comparison

The data in table 1 show that the compositions of the invention exhibit much better phosphorus stability than the prior art (reduced phosphorus release). The compositions of the invention are also found to have a "darker" color (delta L value smaller) and to have less red/yellow coloring (delta a and delta b values smaller).

Pale-colored PA Molding Compositions
Basic Formulation for Table 2

| Component [% by weight] | A/2 | 44.1 |
|---|---|---|
| | B/2 | 2 |
| | D | 10 |
| | E/1 | 25 |
| | E/2 | 0.35 |
| | E/3 | 0.35 |
| | E/4 | 0.7 |
| | E/5 | 5 |
| | E/6 | 12.5 |
| Component | E/5: | Titanium dioxide |
| Component | E/6: | Melamine polyphosphate |

The respective components C) (see table 2) were incorporated in the abovementioned formulation, in each case at 1% by weight (PA content being correspondingly 43.1% by weight).

Mini Extrusion

The specimens were incorporated by means of mini extrusion, using a Micro 15 extruder from DSM. The processing took place at 280° C.

Color measurement: see table 1.

Daylight Aging

Exposure to light in accordance with DIN EN ISO 11341 Method 2:0.35 W/m²×nm) at 340 nm, exposure time 24 h; exposure temperature 38° C. (+−2° C.), exposure humidity 50% (+/−10%).

TABLE 2 color fastness

| | Color measurement | | | Delta color measurement after weathering | | | |
|---|---|---|---|---|---|---|---|
| | L* | a* | b* | L* | a* | b* | Δ E |
| Basic formulation (for comparison) | 72 | 12 | 10 | 3.4 | −7.5 | −6.4 | 10.43 |
| +Ag(I)Cl | 63 | 1 | 3 | 0.22 | 0 | 0.13 | 0.25 |
| C/2 with KI (1:2) | 67 | 2 | 1 | 0.58 | −0.91 | 0.31 | 1.12 |
| +Cu(I) acetate | 64 | +1 | −1 | 0.9 | −0.23 | −0.14 | 0.94 |
| +Cu(I)Br | 62 | −1 | −4 | 0.21 | −0.2 | −0.1 | 0.30 |
| +Cu(I)Cl | 62 | −1 | −3 | 0.25 | −0.04 | −0.16 | 0.30 |
| +Cu(I)I | 64 | −1 | −3 | 0.31 | −0.28 | 0.35 | 0.68 |
| +Cu(I)₂O | 59 | −1 | −3 | 0.78 | −0.02 | −0.16 | 0.80 |
| +Cu(II)O (for comparison) | 67 | 5 | 4 | 1.23 | −1.71 | 0.22 | 2.12 |
| +Cu(I) oxalate | 61 | −1 | −3 | 0.62 | −0.11 | −0.24 | 0.67 |
| Cu(I)SCN | 64 | −1 | −2.2 | 0.04 | −0.02 | −0.02 | 0.05 |

Production of the Molding Compositions for Table 3

The thermoplastic material was processed by means of a Leistritz ZSK 25-F41 twin-screw extruder with throughput 30 kg/h. Extrusion temperature was 300° C. The polymer strand was cooled by means of a waterbath and then pelletized and dried. Injection molding to give the test specimens used took place at 320° C.

Mechanical Properties were Measured in Accordance With
Tensile modulus of elasticity: DIN EN ISO 527-1/-2
Tensile strain at break: DIN EN ISO 527-1/-2
Tensile stress at break: DIN EN ISO 527-1/-2
Charpy impact resistance: DIN EN ISO 179.
Flame retardancy was tested in accordance with UL 94.

TABLE 3

| | Components | | | |
|---|---|---|---|---|
| | comp1 | 1 | 2 | 3 |
| A/2 | 36.75 | 36.5 | 36.25 | 35.75 |
| B/2 | 1.85 | 1.85 | 1.85 | 1.85 |
| C/2 with KI (1:2) | | 0.25 | 0.5 | 1 |
| D | 10 | 10 | 10 | 10 |
| E/1 | 25 | 25 | 25 | 25 |
| E/2 | 0.35 | 0.35 | 0.35 | 0.35 |
| E/3 | 0.35 | 0.35 | 0.35 | 0.35 |
| E/4 | 0.7 | 0.7 | 0.7 | 0.7 |
| E/5 | 12.5 | 12.5 | 12.5 | 12.5 |
| E/6 | 12.5 | 12.5 | 12.5 | 12.5 |
| Mechanical properties | | | | |
| Modulus of elasticity/MPa | 8353 | 7539 | 7373 | 7205 |
| Tensile stress at break/MPa | 91 | 90 | 90 | 84 |
| Tensile strain at break/% | 1.8 | 2.4 | 2.2 | 1.9 |
| Charpy without notch at 23° C./kJ/m² | 42 | 43 | 43 | 38 |
| UL 94 0.8 mm 2 d/23° C. | | | | |
| Classification | V-0 | V-0 | V-0 | V-0 |
| CTI measurement/V | not measured | 400 | 400 | 400 |
| Color measurement | | | | |
| ΔL* | 77 | 76 | 72 | 70 |
| Δa* | 7 | 6 | 3 | 1 |
| Δb* | 6 | 6 | 2 | 0 |
| Color fastness after 24 h of dry weathering | | | | |
| ΔL* | 79 | 78 | 73 | 70 |
| Δa* | 3 | 3 | 2 | −0.24 |
| Δb* | 4 | 4 | 2 | 2 |
| ΔE* | 4.7 | 3.5 | 1.0 | 2.5 |

The invention claimed is:

1. A method for producing a molding composition consisting of
A) from 20 to 98% by weight of a thermoplastic polyamide,
B) from 0.5 to 40% by weight of red phosphorus,
C) from 0.1 to 3% by weight of a Cu(I) salt or Ag(I) oxide or Cu(I) complex or Ag(I) salt or Cu(I) oxide or Ag(I) complex selected from the group consisting of Cu₂O, Ag₂O, CuSCN, AgSCN, CuCl, AgCl, CuBr, AgBr, CuI, and mixtures of these, D) from 1 to 30% by weight of an impact modifier, and
E) from 0 to 50% by weight of further additional substances, the method comprising mixing with components A), B), D) and optionally E) with component C), wherein the thermoplastic molding compositions, with ΔL color values at least 15% lower than those of PA molding compositions without component C) in accordance with DIN 53236 and ISO 7724-3, CieLab method wherein component E) is selected from the group consisting of carbon fibers, glass fibers, glass beads, amorphous silica, calcium silicate, calcium metasilicate, magnesium carbonate, kaolin, chalk, powdered quartz, mica, barium sulfate, feldspar, lubricants, ZnO, Zn borate, Zn stannate, MgO, $Mg(OH)_2$, $ZnCO_3$, $MgCO_3$, $CaCO_3$, Mg Ca carbonates, AlOOH, sterically hindered phenols, nigrosins, melamine compounds, phosphites, amines, hydroquinones, aromatic secondary amines, resorcinols, salicylates, benzotriazoles, benzophenones, inorganic pigments, sodium phenylphosphinate, aluminum oxide, silicon dioxide, talc powder, and mixtures thereof; and wherein component D) is one or more elastomeric polymers.

2. The method according to claim 1, wherein the composition further comprises an alkali metal halide, and in which component C) is in a mixture with the alkali metal halide.

3. The method according to claim 2, where the alkali metal halide is potassium bromide or potassium iodide, or a mixture of these.

4. The method according to claim 1, wherein component C) is present with an alkali metal halide in a mixing ratio of from 1:10 to 1:1.

5. The method according to claim 1 for the production of a molding composition which, wherein the thermoplastic molding compositions have, with phosphorus release values at 28 days/70° C. of less than 200 µg of phosphorus/specimen.

6. The method according to claim 1, wherein the composition contains from 0.2 to 1.0% by weight of component C.

7. The method according to claim 6, wherein the composition contains 1 to 15% by weight of component B.

* * * * *